United States Patent [19]

Cohen

[11] Patent Number: 4,682,948
[45] Date of Patent: Jul. 28, 1987

[54] METHOD AND APPARATUS FOR PRODUCING CEMENT CLINKER INCLUDING WHITE CEMENT

[75] Inventor: Sidney M. Cohen, Allentown, Pa.

[73] Assignee: Fuller Company, Bethlehem, Pa.

[21] Appl. No.: 835,664

[22] Filed: Mar. 3, 1986

Related U.S. Application Data

[62] Division of Ser. No. 655,820, Oct. 1, 1984, Pat. No. 4,595,416.

[51] Int. Cl.⁴ .......................... F27B 15/00; F22B 1/00
[52] U.S. Cl. ..................................... 432/58; 110/245; 122/4 D; 432/106
[58] Field of Search ............... 106/100, 101; 432/58, 432/15, 106; 110/245, 106

[56] References Cited

U.S. PATENT DOCUMENTS

| | | | |
|---|---|---|---|
| 3,366,080 | 1/1968 | Albertson | 110/245 |
| 3,397,657 | 8/1968 | Mitsurutada | 110/245 |
| 4,102,277 | 7/1978 | Wall | 110/245 |
| 4,128,392 | 12/1978 | Tock | 432/58 |
| 4,227,488 | 10/1980 | Stewart et al. | 122/4 D |
| 4,325,327 | 4/1982 | Kantesaria et al. | 122/4 D |
| 4,378,744 | 4/1983 | DeFeo et al. | 110/245 |
| 4,409,909 | 10/1983 | Tomizawa et al. | 110/245 |
| 4,419,965 | 12/1983 | Garcia-Mallol et al. | 110/245 |
| 4,437,834 | 3/1984 | Vogel | 432/58 |
| 4,552,203 | 11/1985 | Chrysotome et al. | 110/245 |

*Primary Examiner*—Henry C. Yuen
*Attorney, Agent, or Firm*—Frank H. Thomson

[57] ABSTRACT

A method and apparatus for producing cement which includes intermixing the cement forming raw materials with water, coal or coke cement as a binder and forming this mixture of materials into nodules by pelletizing or extrusion. The system is particularly designed for use in making white cement where raw materials low in coloring compound are used as raw feed. The nodules are then sized to obtain a feed material having a size range on the order of one quarter inch by 14 mesh which is suitable for use in a fluidized bed reactor. The nodulized raw material is thermally processed in a fluidized bed reactor at temperatures in the range of approximately 2500° to 2700° F. for white cement and 2350°–2450° F. for typical gray Portland Cement. The coal or coke mixed with the raw material serves to supply between 60% and 90% percent of the fuel required for the process with the remainder being supplied directly to the fluidized bed. This fuel serves to provide internal reduction conditions within the particles of material. The product is discharged from a fluidized bed and cooled in an indirect heat exchanger.

2 Claims, 3 Drawing Figures

METHOD AND APPARATUS FOR PRODUCING CEMENT CLINKER INCLUDING WHITE CEMENT

BACKGROUND OF THE INVENTION

This is a division of application Ser. No. 655,820, filed Oct. 1, 1984, now U.S. Pat. No. 4,595,416.

This invention relates to a process and apparatus for the production of cement clinker and in particular to a process and apparatus for the manufacture of cement clinker utilizing a fluidized bed apparatus. The process and apparatus are particularly suited to small capacity plants and specifically to the production of cement of a light color or white cement.

Prior to the present invention, portland cement has been produced in long rotary kilns utilizing the wet or dry processes, relatively short kilns utilizing suspension preheaters, with or without precalcining systems, and in fluidized bed reactors. Most modern cement plants are designed to produce large capacities on the order of 1,000 tons per day and up to 5,000 tons per day. There are many situations where it is desirable to provide a cement clinker producing facility having a small capacity on the order of between 25 tons per day and 500 tons per day. These small capacity plants are sometimes referred to as "mini" cement plants.

Prior to the present invention, "mini" cement plants have utilized small rotary kilns with perhaps a single stage preheater and a rotary cooler. To my knowledge, a small capacity cement clinker production facility utilizing a fluidized bed apparatus and auxiliary equipment according to the present invention has not been proposed.

An efficient low capacity cement plant is desirable where cement usage is low such as in remote regions of developing countries and for the manufacture of specialty cements such as white cement.

White cement is produced from raw materials low in coloring elements such as iron, manganese and chromium, normally utilizing high grade limestone, white clay and pure silca as raw materials. White cement is used primarily for architectual applications requiring white or colored concrete.

Due to a low iron content, normally less than 0.5% $Fe_2O_3$, the potential liquid formation within the clinkering process for white cement is low and the burnability of the raw material is very hard. A typical silica modules for white clinker is in the 4 to 6 range compared with 2.3 and 3.0 for gray cement. As is well known the silica modules is determined as follows:

$$\text{Silica Modulus} = \frac{SiO_2}{Al_2O_3 + Fe_2O_3}$$

Due to the difficult burnability of the raw materials, the raw materials for white cement manufacture are usually ground very fine with 90% to 95% being −200 mesh being a typical grind. The grinding takes place in raw mills utilizing ceramic or alloy steel grinding media to reduce possible iron contamination of the raw material.

With white cement manufacturing apparatus, recuperative air quenching clinker coolers used in normal gray cement applications are not utilized as the clinker must be protected against oxidation of the iron content contained therein down to at least 700° C. and preferably lower. Typically, water and oil sprays are used at the discharge end of the kiln to prevent oxidation after the burning zone and water quenching in drag conveyors is used after the clinker is discharged from the kiln. Some applications have used a decolorizing cooler using a $CO_2$ or CO gas as the cooling medium. The absence of a recuperative air quenching clinker cooler tends to result in high fuel consumption for a white cement manufacturing process.

Equipment used conventionally for the production of white cement generally has short refractory life. This is due to the low potential liquid in the raw material which results in little coating in the hot zone of the conventional rotary kiln.

Fuels utilized in the manufacture of white cement are usually either natural gas or oil. Solid fuels such as coke or coal are not normally used in the manufacture of white cement due to the potential spot contamination of the material caused by ash fusion and incomplete chemical dispersion of the ash. As stated in U.S. Pat. No. 3,114,648 issued Dec. 17, 1963, free carbon in the clinker is objectionable due to the dark color it imparts to the finished cement.

Due to the difficult burnability of raw meal used for manufacturing white cement, the lack of a clinker cooler which utilizes heat recuperation and high kiln radiation due to high temperature of the kiln, fuel consumption for manufacturing white cement is typically 50% to 100% greater than that for the manufacture of gray cement clinker. It would be desirable to provide a process and apparatus capable of reducing the fuel consumption required to produce white cement, increase refractory life and permit the utilization of coal as a fuel.

It would also be desirable to provide a cement manufacturing process and apparatus which would allow reduced capital investment for a low capacity plant and be capable of utilizing solid fuel.

SUMMARY

It is an object of this invention to provide a process and apparatus for producing cement clinker which is specifically designed for small capacities.

It is another object of this invention to provide a process for manufacturing white cement clinker which has reduced fuel consumption as compared with known methods for manufacture of such cement.

It is another object of the invention to provide an apparatus for producing light colored cement which is capable of utilizing a solid fuel such as coal or coke in the combustion process.

It is a further object of this invention to provide a method and apparatus for manufacturing cement at small capacities which increases equipment.

In general, the foregoing and other objects will be carried out by providing a process of producing white cement comprising the steps of providing cement-forming raw materials low in coloring elements; intermixing water, carbon bearing material and a binder with the cement forming raw materials to form a mixture; forming the mixture into nodules; drying the nodules; sizing the nodules to obtain a feed material having a particle size within a selected size range; supplying the feed material to a vessel; passing air upwardly through the material within the vessel to maintain a fluidized bed of material within the vessel; thermal processing the feed material within the fluidized bed by combustion of the carbon bearing material within the feed material and supplying additional fuel to the fluidized bed for maintaining the fluidized bed at a temperature in the range of approximately 2500° to 2700° for white cement and 2350° to 2450° for gray cement; discharging cement clinker from the fluidized bed by displacement; and cooling the discharged material.

With the present invention, a feed preparation system for producing white cement includes mixing finely ground raw materials low in coloring elements with water, coal or coke and white cement as a binder to form a mixture. If the process and apparatus are used to produce grey or ordinary portland cement, the raw material can be normal cement raw meal and the binder can be ordinary Portland cement. The mixture is conveyed to either a disc pelletizer or an extruder to produce the nodules. The nodules are then dryed in a tray dryer and may be stored after drying. The nodules produced by the extrusion process are then crushed and screened to produce a feed material of a desired size range. The disc pelletizer nodules in most cases will be used directly after drying. The sized feed material is then supplied to a fluidized bed reactor for thermal processing to produce cement clinker. An indirect heat exchanger is used to recuperate some of the heat of the discharged product and use such heat for drying the material. The hot spent fluidizing gases from the reactor are used to preheat fluidizing gas and air for combustion by means of an indirect heat exchanger.

BRIEF DESCRIPTION OF THE DRAWINGS

The invention will be described in connection with the annexed drawings wherein.

DESCRIPTION OF THE PREFERRED ENVIRONMENT

Figure 1:
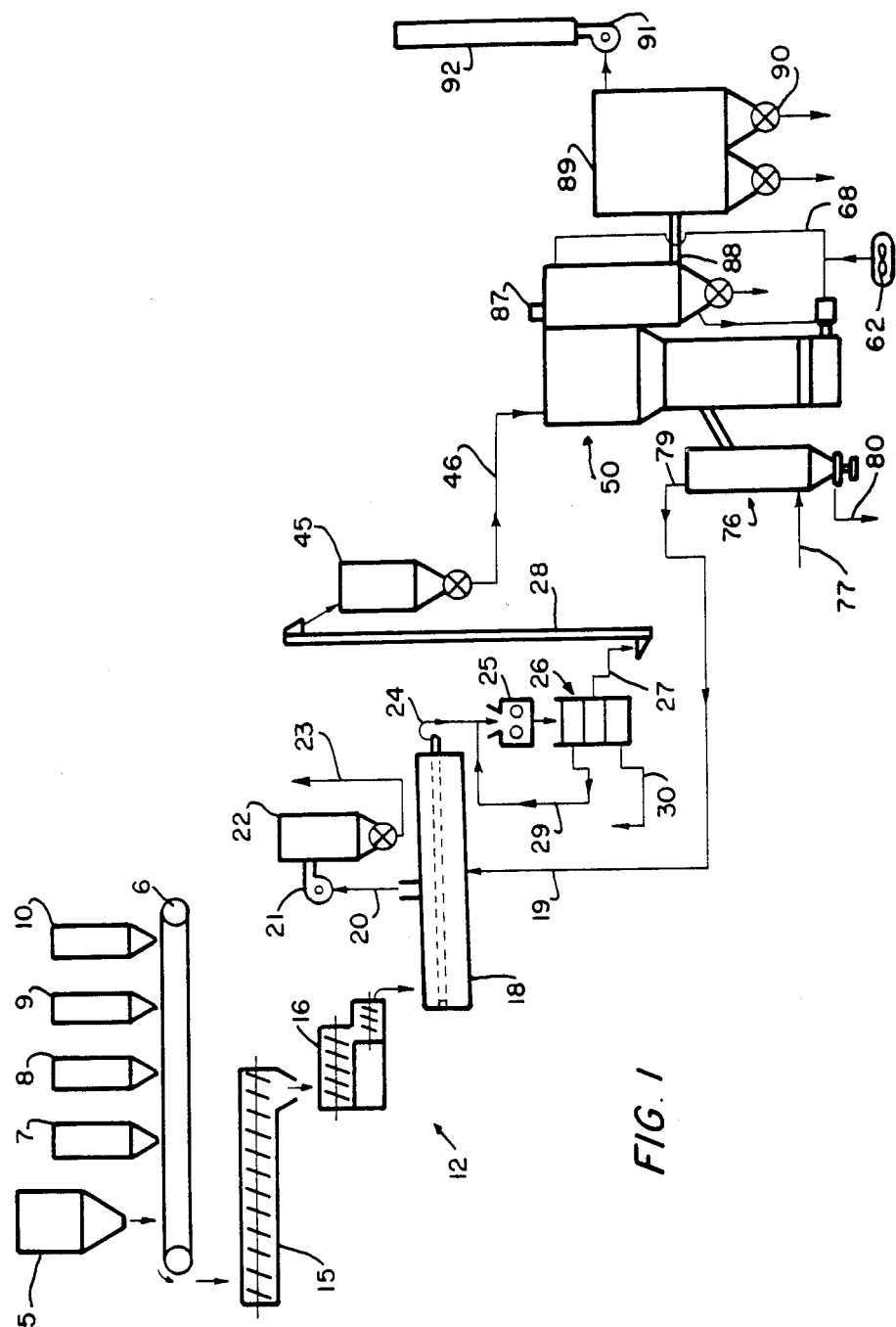
FIG. 1 is a diagrammatic view of the apparatus of the present invention.

With the present invention, cement forming raw materials are metered from a bin such as that illustrated at 5 in FIG. 1 onto a belt conveyor 6. If the process and apparatus is to be utilized for manufacturing white cement, the raw materials must be low in coloring elements, that is low in iron, manganese and chromium. Carbon bearing materials such as coal or coke is added to the belt 6 from a bin 7 in an amount sufficient to bring the carbon content of the final raw material to the range of approximately 5% to 9% by weight carbon content. This may be between 60% and 80% of the process fuel requirements but up to 90% of the required fuel to obtain clinkering temperatures can be added with the pellet feed. A suitable binder, preferably cement is added from a bin 8 to the conveyor 6 in an amount of up to 5% by weight. If white cement is being produced, the binder should be white cement. The apparatus may include additional bins such as that indicated at 9 for recycled material and a spare bin 10 which may be used for an additive if required by the process.

The raw material, the coal or coke and binder are transported by conveyor 6 to apparatus for combining the solid material with water and forming the mixture of water, raw material, coal or coke and cement into nodules. In FIG. 1, this apparatus is illustrated as a pug mill 15 and extruder 16. The pug mill 15 mixes and conveys the material to an extruder 16 where extrusions or nodules are formed. The extruded material is then supplied to a tray dryer generally indicated at 18. The dryer is supplied with heated drying gas through conduit 19. Exhaust gas from the dryer is supplied through a conduit 20 and fan 21 to a high efficiency dust collector 22. Dust from the collector 22 is removed at 23 and may by supplied to the recycle bin 9. Dryed nodules are then sized to obtain a feed material having a selected size range. In the embodiment illustrated in FIG. 1, sizing of the nodules or extrusions is carried out by supplying the nodules to a roll crusher 25. Crushed material then goes through a series of screens generally indicated at 26 where a desired sized material is removed at 27 and supplied as feed material to a bucket elevator 28. Oversized material is taken off at 29 for recycle to the roll crusher 25. Undersized material is removed at 30 for recycle to bin 9. In the preferred form, the material is sized to produce a product having a size range of one-fourth inch by 14 mesh.

The conveyor 6, pug mill 15, extruder 16, tray dryer 18, crusher 25 and screen system 26 together constitute a feed preparation system generally indicated at 12. The conveyor, pug mill and extruder define means for combining the cement forming raw materials with carbon bearing material, a binder and water to form a mixture and for forming the mixture into nodules. The tray dryer and hot gas inlet 19 define a means for drying the nodules.

In the preferred method, the extrusions are dryed on tray dryer 18 to produced a hard nodule discharged at 24. The dryed nodules are sent to storage for a period of 1 to 3 days for aging to allow the binder to increase the pellet or nodule strength. The stored or aged pellets may then be supplied to the roll crusher 25 rather than directly from discharge as illustrated.

Figure 2:
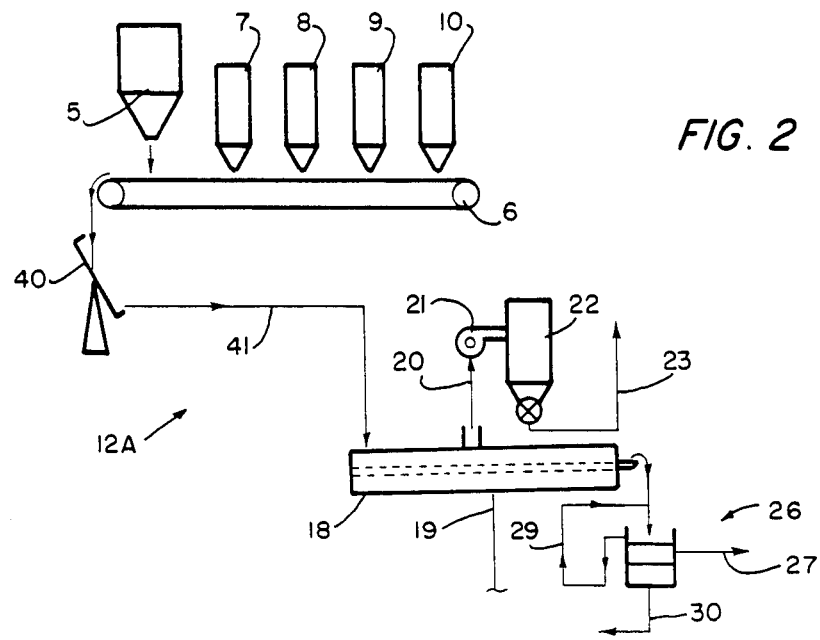
FIG. 2 is a diagrammatic view a portion of a modified apparatus for carrying out the process of the present invention.

An alternate feed preparation system is illustrated in FIG. 2 and generally indicated at 12A. In this feed preparation system, raw material, carbon and cement are suppled through similar bins 5, 7 and 8 to a common conveyor 6 in the manner of FIG. 1. The conveyor feeds the material to a disk or drum pelletizer 40. Water is added to the disk pelletizer and mixing takes place directly in the pelletizer with the pelletizer being controlled to produce a nodule or pellet having size range of one quarter inch by 14 mesh. In this embodiment, wet pellets leave the pelletizer 40 and are transported as indicated at 41 to a tray dryer 18. The tray dryer is supplied with heated drying gas at 19 and spent drying gas is exhausted through conduit 20, fan 21 and high efficiency dust collector 22 in the manner of FIG. 1. Dust is returned at 23 to bin 9. The discharge from dryer 18 may go to a screen illustrated at 26 with oversize being supplied at 29 to a small crusher (not shown in FIG. 2) and undersized material being returned at 30 to bin 9. Properly sized feed material is discharged at 27 for further processing. In this embodiment as in FIG. 1, it is preferred that the dryed pellet be sent to storage for between one and three days.

As illustrated in FIG. 1, properly sized material is supplied by bucket elevator 28 to a storage bin 45. Material is metered out of the bin 45 and conveyed through line 46 to a fluidized bed reactor generally indicated at 50 for thermal processing the material to produce cement clinker. Refering to FIG. 3, the fluidized bed reactor 50 includes a vessel 51 having an inlet 52 for the dried and sized material from the feed preparation system 12 or 12A (FIG. 1 or FIG. 2 respectively). The vessel 50 is divided into an upper material chamber 53 and a lower plunnum chamber 54 by means of a gas permeable grid 55 known in the art. Means are provided for supplying air under pressure of fluidizing gas to the plunnum chamber 54 for passage upwardly through the grid 55 and a bed 57 of feed material to thereby establish and maintain a fluidized bed 60 of nodules. Fuel in addition to that combined with the feed material is supplied through nozzle 61 to the bed 64 combustion within the fluidized bed 60. The amount of fuel added is sufficient to maintain the material within the fluidized bed at cement clinkering temperatures.

Figure 3:
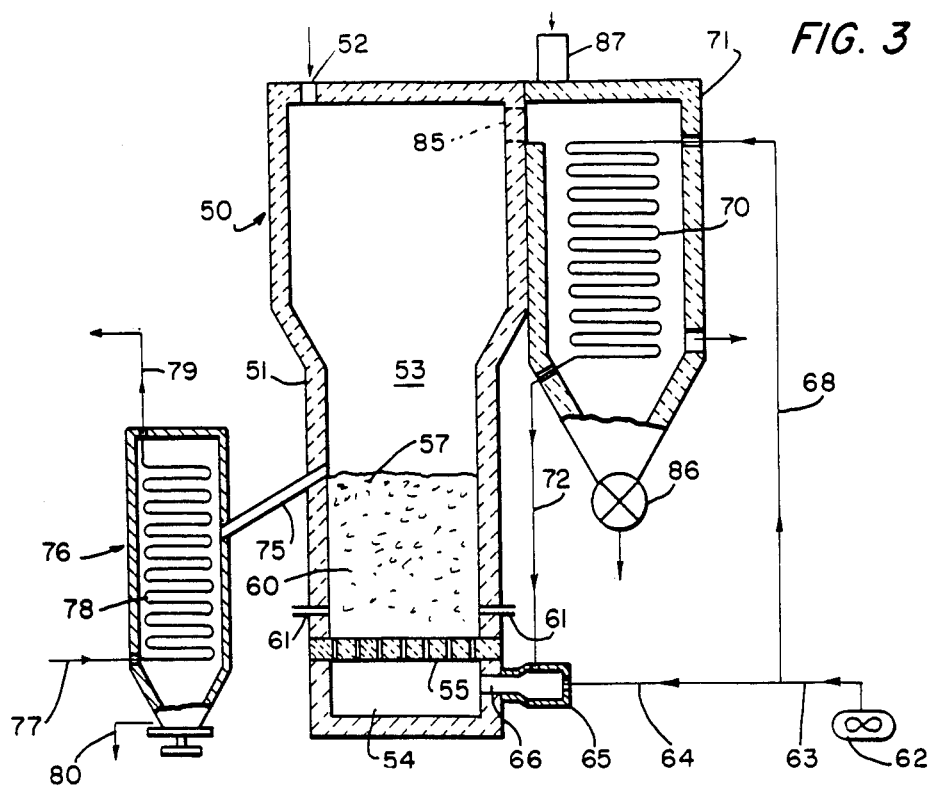
FIG. 3 is a diagrammatic view on an enlarged scale of the pyroprocessing portion of apparatus utilized for carrying out the process of the present invention.

The air supply of the present system is illustrated in FIG. 3 and includes a blower 62 having its outlet 63 connected via conduit 64 to an auxiliary air heater 65 for connection through inlet 66 to the plunnum chamber 54. The outlet 63 is also connected to a conduit 68 which is connected to a heat exchanger 70 within a knock-out chamber 71. Heat exchanger 70 is connected via conduit 72 to the air heater chamber 65.

With the present invention, carbon present in the feed will supply 60% to 80% of the processed fuel besides being used for maintaining thermal reduction conditions within the feed particles. When manufacturing white cement, this internal reduction condition controls the iron reactions to keep from forming $Fe_2O_3$ which is an undesirable coloring compound. The reduction aids in the production of a whiter of brighter product by eliminating potential oxidation of the iron content present in the raw material. While the raw material for white or light colored cement will contain a low iron content as compared with grey Portland cement, that iron which is present should be converted to $Fe_3O_4$ rather than to $Fe_2O_3$ to avoid the objectionable color. This is done in part by maintaining the reducing conditions internally within the particles. The present invention differs from that disclosed in U.S. Pat. No. 3,114,648 which utilizes fuel sprayed onto pellets to keep the fuel in close proximity to the raw meal. With the present invention, the carbon bearing material is mixed with the raw feed. This means that a solid fuel heretofore considered undesirable in the production of white cement may be utilized. The utilization of solid fuel and the corresponding reduction in gas or liquid fuel is particularly advantageous to the production of cement in those parts of the world where coal is more readily available than gas or oil.

With the present invention, the temperature within the fluidized bed is maintained on the order of 2500° to 2700° F. for white cement and between approximately 2350° and 2450° F. for grey cement. This compares with temperatures used in the prior art of 2700° to 2900° F. for the manufacture of white cement. The lower temperature will mean a reduced fuel consumption and improved refractory life. The temperature is maintained at that which is necessary to produce the clinker with a free line content of under 2%.

As material is supplied to the fluidized bed 60, product is discharged by displacement through overflow conduit 75 to an indirect cooler 76. Material discharged from vessel 51 is by displacement so that the rate of discharge of material depends upon the rate of feed of material to the vessel. Material retention time should be on the order of 1 to 2 hours.

Product discharged through conduit 75 is supplied to heat exchanger 76 where it is cooled by indirect heat exchange with cooling air supplied from a source such as a blower (not shown) through conduit 77 to heat exchanger coil 78. Air is heated in the heat exchanger 76 and discharged from coil 78 through conduit 79. As illustrated in FIG. 1, conduit 79 is flow connected to conduit 19 so that the thus heated cooling air is utilized for drying materials in the tray dryer thereby reducing overall fuel consumption of the process. Product is discharged from cooler 76 through outlet 80. Depending upon the raw material and the temperature of bed 60, a product may be either cement clinker or an intermediate product. The use of the indirect heat exchange is required in the production of white cement clinker to prevent the oxidation of the iron compounds which oxidation is hastened at elevated temperatures. If grey cement is being manufactured, it may be desirable to use a direct heat exchanger for heat recovery.

Spend fluidizing gases will entrain a portion of the incoming feed and some fine product. This material will be discharged through an outlet 85 and through a knock-out chamber 71. In the knock-out chamber 71, the elutriated fine incoming feed and fine product will be separated from the gases in which it is entrained. This product will be discharged through a suitable air lock 86.

A vent or bleed air system 87 is flow connected to a knock-out chamber 71 for the purpose of cooling the off gases leaving the reactor so that they may be supplied through conduit 88 to a high efficiency dust collector 89 with the solid material being separated and discharged at 90 and the gas being discharged to atmosphere through fan 91 and stack 92. The bleed air serves to protect the bags of a bag type collector.

If desired, cold water coils can be used for the final cooling step of the product in heat exchanger 76.

It should be noted that air heater 65 may be required to be a separate fired vessel for the purposes of start-up.

For a "mini" cement plant, the following approximate sizes for reactors 50 are to be considered:

| Clinker Capacity in Tons Per Day | Reactor Size Diameter in feet |
| --- | --- |
| 25 | 4.0 |
| 50 | 6.0 |
| 100 | 8.5 |
| 200 | 12.0 |
| 300 | 14.5 |
| 500 | 18.5 |

From the foregoing it should be apparent that the objects of the present invention have been carried out. A system has been provided for producing white cement which has reduced fuel consumption as compared with prior apparatus in that the reactions can be carried out at lower temperatures. An economical system has been provided in that lower capital costs are required with the present invention as compared with the capital costs of a rotary kiln system used by the prior apparatus. This is true for not only the production of white cement, but also the system as used for producing Portland cement. The utilization of a fluid bed system also provides for reduced real estate usage due the nature of the equipment. With the present invention, it is possible to utilize a higher percentage of solid fuels than was previously considered advisable in the production of white cement.

It is intended that the foregoing be a description of a preferred embodiment, but that the invention be limited solely by that which is within the scope of the intended claims.

I claim:

1. Apparatus for producing cement clinker comprising:
- a feed preparation system including means for combining cement forming raw materials with carbon bearing material, a binder and water to form a mixture and for forming the mixture into nodules, means for drying the nodules and means for sizing the nodules;
- a vessel having a gas permeable grid dividing the vessel into a lower plenum chamber and an upper material chamber;
- means for supplying the sized nodules to the upper material chamber;
- means for supplying air under pressure to said lower plenum chamber for passage upwardly through the gas permeable grid for establishing and maintaining a fluidized bed of nodules within the upper material chamber;
- means for supplying additional fuel to the upper material chamber for combustion together with the carbon bearing material within the nodules for maintaining the fluidized bed at cement clinkering temperature;
- said upper material chamber having an outlet for cement clinker and an outlet for spent combustion gas;
- a heat exchanger flow connected to the outlet for cement clinker for cooling cement clinker discharged from the upper material chamber including means for supplying ambient air thereto for heat exchange with the cement clinker whereby the cement clinker is cooled and the ambient air is heated;
- means for supplying the heated ambient air to the means for drying the nodules; and
- a heat exchanger flow connected to the outlet for spent combustion gas of the vessel including means for supplying ambient air thereto for indirect heat exchange with the spent combustion gas whereby the spent combustion gas is cooled and the ambient air is heated and an outlet for heated ambient air flow connected to said means for supplying air to the lower plenun chamber;
- said means for forming the mixture of cement forming raw material, carbon bearing material, water and a binder into nodules is an extruder and said means for drying the nodules is a tray dryer flow connected to the heat exchanger for cooling cement clinker.

2. Apparatus for producing cement clinker comprising:
- a feed preparation system including means for combining cement forming raw materials with carbon bearing material, a binder and water to form a mixture and for forming the mixture into nodules, means for drying the nodules and means for sizing the nodules;
- a vessel having a gas permeable grid dividing the vessel into a lower plenum chamber and an upper material chamber;
- means for supplying the sized nodules to the upper material chamber;
- means for supplying air under pressure to said lower plenum chamber for passage upwardly through the gas permeable grid for establishing and maintaining a fluidized bed of nodules within the upper material chamber;
- means for supplying additional fuel to the upper material chamber for combustion together with the carbon bearing material within the nodules for maintaining the fluidized bed at cement clinkering temperature;
- said upper material chamber having an outlet for cement clinker and an outlet for spent combustion gas;
- a heat exchanger flow connected to the outlet for cement clinker for cooling cement clinker discharged from the upper material chamber including means for supplying ambient air thereto for heat exchange with the cement clinker whereby the cement clinker is cooled and the ambient air is heated;
- means for supplying the heated ambient air to the means for drying the nodules; and
- a heat exchanger flow connected to the outlet for spent combustion gas of the vessel including means for supplying ambient air thereto for indirect heat exchange with the spent combustion gas whereby the spent combustion as is cooled and the ambient air is heated and an outlet for heated ambient air flow connected to said means for supplying air to the lower plenum chamber;
- said means for forming the mixture of cement forming raw material, carbon bearing material, water and a binder into nodules is a pug mill and said means for drying the nodules is a tray dryer flow connected to the heat exchanger for cooling cement clinker.

* * * * *